March 25, 1958 D. S. RIDLER 2,828,358

MULTIPLE TELEGRAPH SIGNAL REGENERATORS

Filed Feb. 11, 1954 5 Sheets-Sheet 1

Clock Pulse Generator

Inventor
D. S. RIDLER
By [signature]
Attorney

Inventor
D. S. RIDLER
By R P Morris
Attorney

March 25, 1958 D. S. RIDLER 2,828,358
MULTIPLE TELEGRAPH SIGNAL REGENERATORS
Filed Feb. 11, 1954 5 Sheets-Sheet 3

Inventor
D. S. RIDLER
By R. A. Morris
Attorney

Fig. 6.
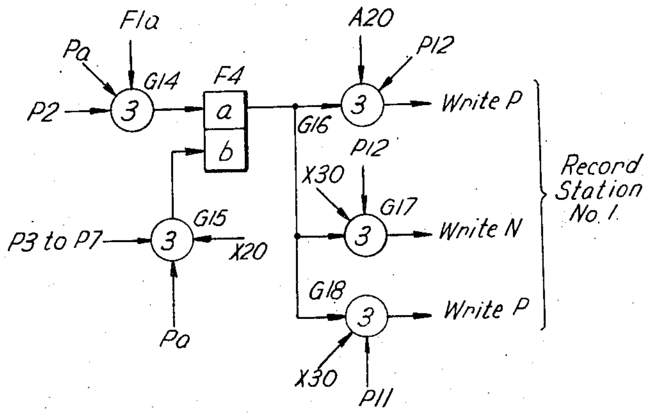
Interval Detector
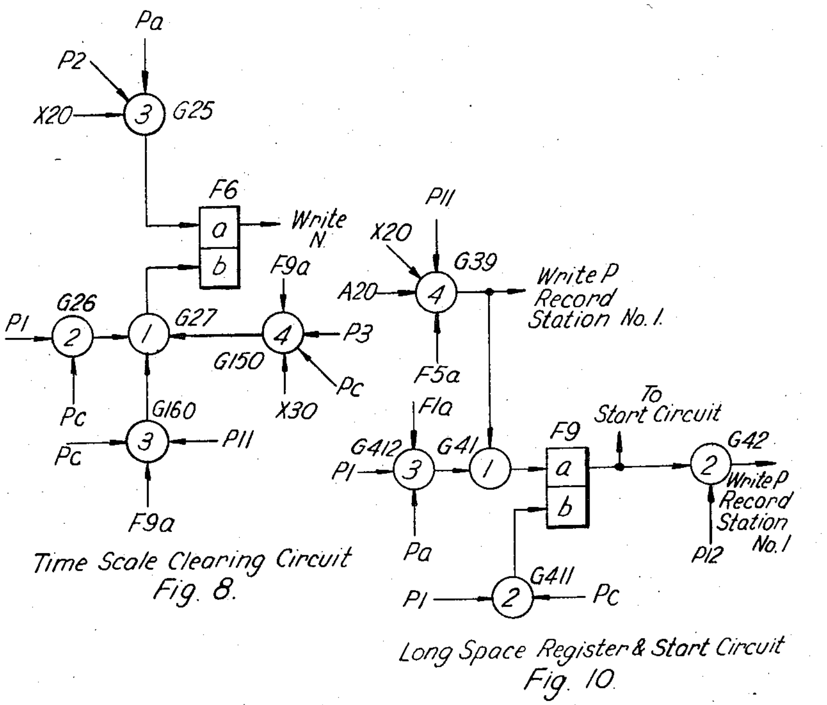
Time Scale Clearing Circuit
Fig. 8.
Long Space Register & Start Circuit
Fig. 10.
Inventor
D. S. RIDLER
By [signature]
Attorney

MULTIPLE TELEGRAPH SIGNAL REGENERATORS

Filed Feb. 11, 1954 5 Sheets-Sheet 5

Inventor
D. S. RIDLER
By R. P. Morris
Attorney 2,828,358

United States Patent Office

Patented Mar. 25, 1958

2,828,358

MULTIPLE TELEGRAPH SIGNAL REGENERATORS

Desmond Sydney Ridler, London, England, assignor to International Standard Electric Corporation, New York, N. Y., a corporation of Delaware Application February 11, 1954, Serial No. 409,614

Claims priority, application Great Britain February 13, 1953

13 Claims. (Cl. 178—70)

The present invention relates to timing equipment and more particularly, but not exclusively, to the use of such timing equipment in multiple telegraph regenerators.

During transmission over radio links and land lines the degree of distortion experienced by telegraph signals can be so great as to render them unintelligible to a printing telegraph receiving apparatus, and sonsequently various types of signal regenerative devices have been evolved to regenerate or re-create telegraph signals so that they regain their original shape with zero distortion.

Where a common regenerator is to be used among a number of telegraph channels, means must be provided to allocate the regenerator to each channel in turn and this invention is directed to an improved system for more accurately controlling operation of such a regenerator and periodic scanning of each channel is effected to ascertain the condition thereof.

Since start-stop telegraphy essentially depends upon accurate signal timing as far as both reception and transmission are concerned, it follows that the provision of an efficient timing device is an essential element of such a system.

According to the present invention there is provided timing equipment which comprises a store, means for continuously reading intelligence in said store, counting means for counting the number of complete readings made of said store, and means responsive to said counting means for effecting a further operation when a predetermined number of complete readings has been made.

According to the present invention there is further provided a system for regenerating electric signals in which the length of a regenerated signal is determined by the time taken for a predetermined number of complete readings of a store.

The term "store" as used in this specification means a device in which intelligence can be recorded by creating internal strains in the material of the store, and in which stored intelligence can be detected by detecting the state of the strain in the material.

Examples of internal strains which are used to store intelligence are magnetisations of either one of two polarities, as in the magnetic drum, tape or wire, or in the static magnetic matrix, electrifications of either one of two polarities as in the ferroelectric storage matrix, electric charges of either one of two polarities as in the cathode ray tube storage device, and compression waves as in acoustic delay lines such as mercury delay lines and magnetostrictive delay lines. It will of course be realised that any one of these stores will accommodate a number of signal elements.

One embodiment of the invention will now be described with reference to the accompanying drawings in which.

Figures 2, 5, 9:
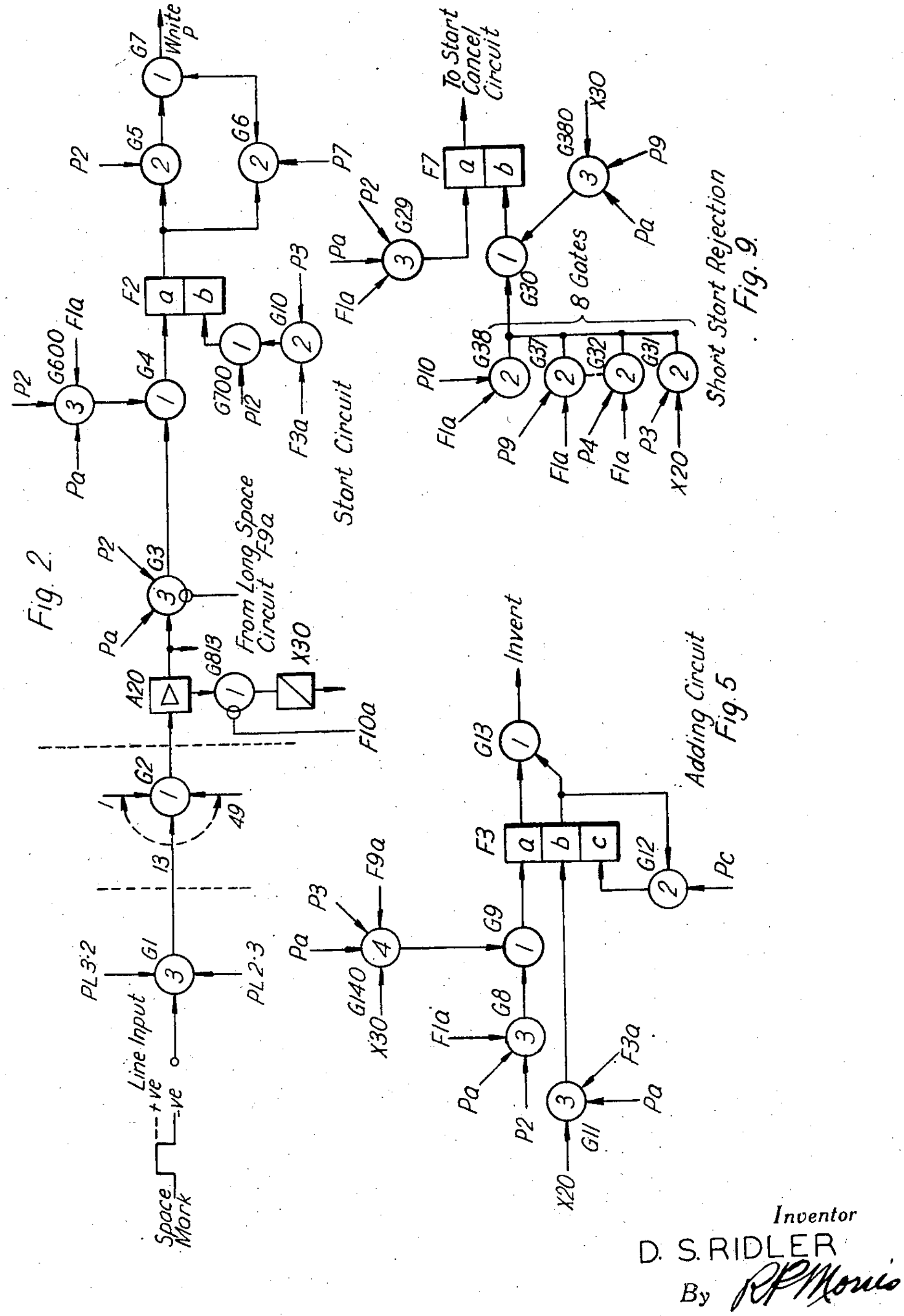
Fig. 2 shows a start circuit.
Figures 3, 4:
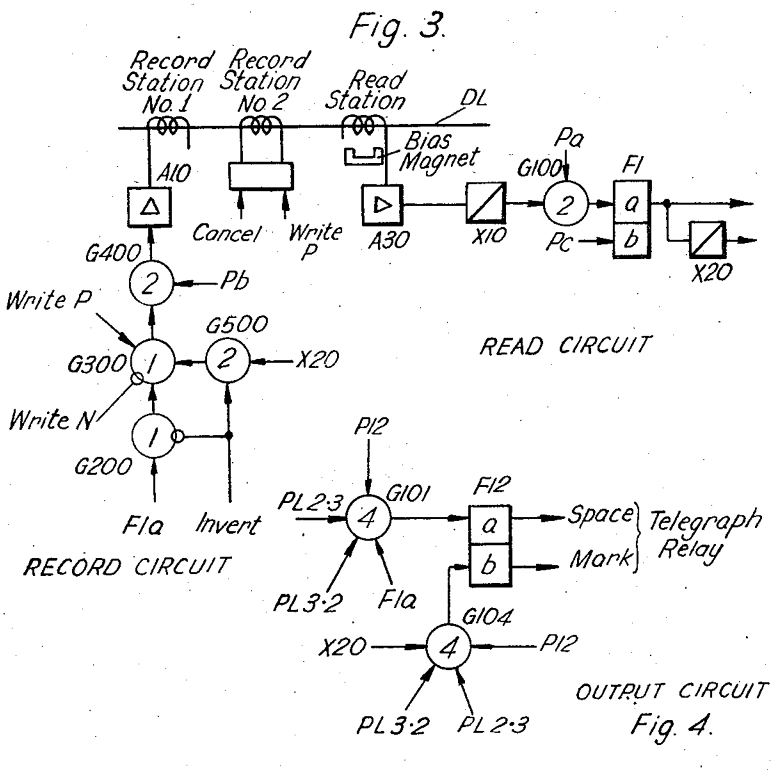
Figure 14:
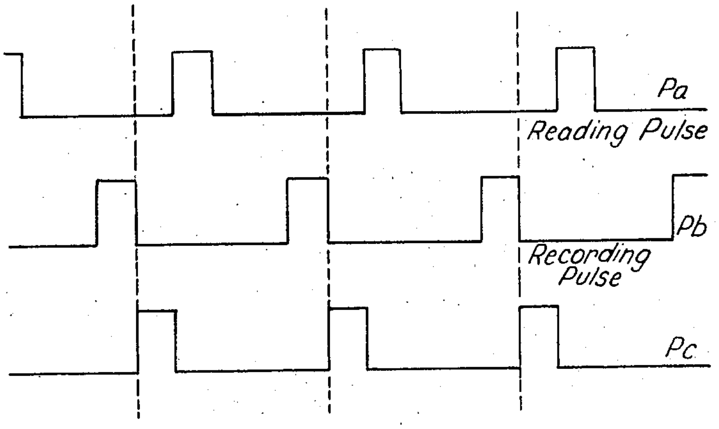
Figures 7, 11, 12, 13:
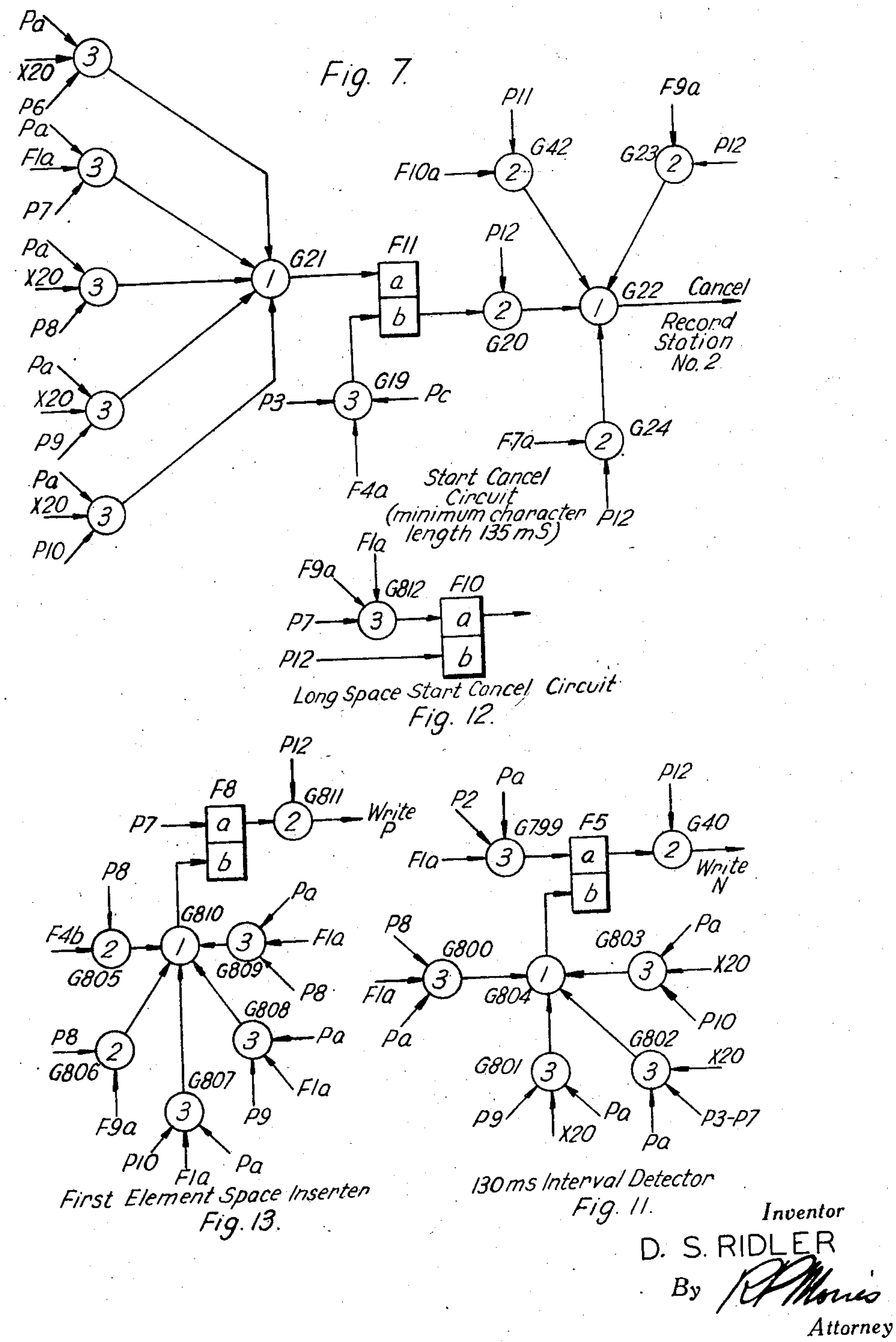

Fig. 3 illustrates a sonic delay line having a first record station and second record station and a read station, Fig. 4 shows the output circuit for operating the output telegraph relay, Fig. 5 shows the adding circuit, Fig. 6 illustrates the interval detector, Fig. 7 illustrates the start cancel circuit, Fig. 8 illustrates the time scale clearing circuit, Fig. 9 illustrates the short start rejection circuit, Fig. 10 illustrates the long space register and start circuit, Fig. 11 illustrates the 130 millisecond interval detector, Fig. 12 illustrates the long space start cancel circuit, Fig. 13 shows the first element space insertion circuit, Fig. 14 shows the disposition of the pulses P*a*, P*b* and P*c*.

In a sonic delay line store signals are transmitted through the material of the delay line in the form of compression waves which travel at speeds substantially equal to the speed of sound in that material. The two best known types of sonic delay line store are the nickel wire delay line and the mercury delay line.

The launching of signals in and extraction of signals from the nickel wire delay line depends for its action on the magnetostrictive properties of nickel. Signals, in the form of a varying magnetic field, are applied to one end of the wire and cause a change in its length. This gives rise to compression waves which travel down the length of the wire. At the other end a permanently magnetised portion of the wire vibrates in sympathy with the compression waves and induces a potential into an electric coil.

A mercury delay line comprises a column of mercury having a piezo-electric crystal at either end. Signals are applied to one of the crystals, which changes its shape and so transmits compression waves through the mercury column. At the far end of the column the compression wave distorts the other crystal and produces a varying electrical potential across it.

In either of these types of delay line further waves may be introduced into the line, or waves travelling down the line may be cancelled, by a third coil or crystal (whichever is appropriate), situated intermediate the ends of the line. This feature of a delay line is used in the embodiment described.

In the embodiment of the invention to be described a sonic delay line is used as a means for delaying signals by a predetermined time. Since the speed at which signals travel down the line is dependent upon its temperature it is desirable to control the temperature of the line. A method of doing this is the subject of my copending application No. 409,611, filed simultaneously herewith.

Although my invention is described with reference to the regeneration of telegraph characters it could equally well be applied to the regeneration of other impulses such as telephone dial impulses.

GENERAL DESCRIPTION OF THE REGENERATOR

Each telegraph line is connected via a scanning circuit to the start circuit of the regenerator so that the condition of each line (by which is meant whether it is at "mark" or "space") is presented in succession to the start circuit. Each line has allocated to it a pulse train having 12 pulse time positions each of which may be in either one of two conditions (hereinafter referred to as "1" or "0". Each pulse train is set in accordance with the condition of the line allocated to it and is put into one end of a sonic delay line. The pulse train travels down the line and after a time determined by the delay of the line is read by a read station. After reading the pulse train is modified and re-introduced into the line so that a continuous circulation takes place. Each cycle is counted by an adding circuit which records in the pulse train the number of cycles performed. At predetermined intervals determined by the number of cycles performed by a pulse train the condition of a line is examined and an output telegraph relay operated in accordance with the line condition.

For maximum economy as many pulses as possible should be made to travel down the sonic line at one time. We have found that for a nickel line having delays of less than a millisecond a million pulses per second is a practicable figure.

In the present embodiment a line having ⅝ millisecond delay is used which gives a total of 600 pulse time positions at a pulse repetition rate of slightly below 1 million pulses per second. 588 of these pulse time positions are allocated to 49 telegraph lines giving 12 pulse time positions (one pulse train) per line. The remaining 12 pulse time positions are used for synchronising purposes.

The twelve pulse time positions in each pulse train have been given the following functions:

*p*1—Long space memory
*p*2—Start memory
*p*3–*p*7—Time scale
*p*8–*p*10—Element counter
*p*11—Mark present memory
*p*12—Mark/space output memory.

Figure 1:
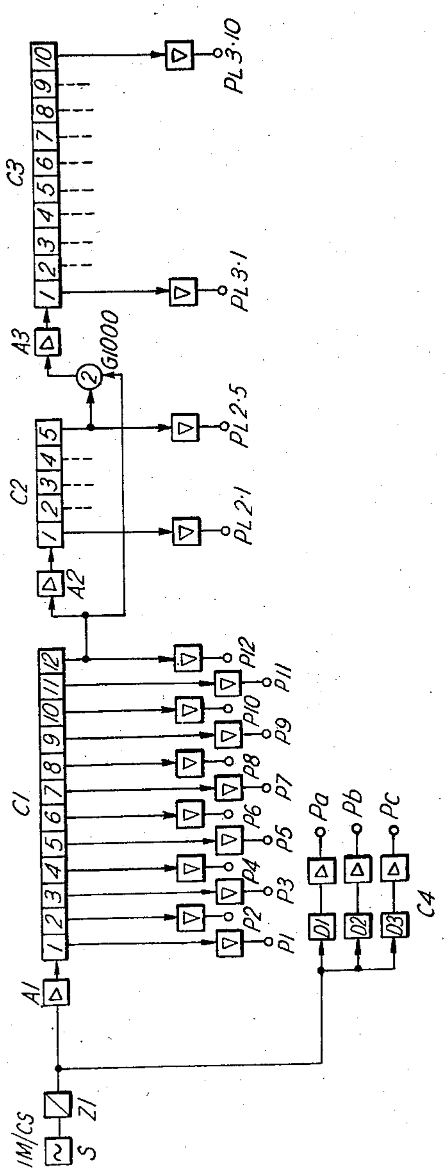
Fig. 1 shows a clock pulse generator.

For each pulse time position a pulse generator as shown in Fig. 1 generates a "master" or "clock" pulse; these are designated P1, P2, P3 . . . P12. For each "clock" pulse three further pulses P*a*, P*b* and P*c* are generated by the pulse generator; the relative occurrence times of these pulses are illustrated in Fig. 14.

The normal condition of a telegraph line i. e. when there is no signal element present, is a "mark." A start element, therefore, is indicated by a "space" condition.

When a line is in its normal or mark condition all the pulse time positions of the pulse train allocated to that line are set at "0." Upon the receipt of a start or "space" condition the start circuit (Fig. 2) operates and "1" is recorded in the sonic delay line DL by record station No. 1 (Fig. 3) in positions *p*2 and *p*7 of the pulse train allocated to that line. Five eighths of a millisecond later the pulse train is read by the read station and ultimately the output is applied to the lead out of X20 to the adding circuit (Fig. 5) which counts 1 to indicate the first circulation and records this in the pulse train by putting "1" in position *p*3. This last insertion is accomplished by deriving an output from the gate G13 in Fig. 5 and applying it to the input of gate G500 in Fig. 3. The pulse train then reintroduced into the line at record station No. 1 travels down the sonic line DL to the read station. The pulse train continues to circulate in this way for 16 cycles i. e. 10 milliseconds with one being added to the time scale at each cycle. At the end of 16 cycles the interval detector (Fig. 6) operates and records the condition of the telegraph element in position *p*12. Since this condition is a "space" for the start element "1" is recorded in position *p*12, there being a coincidence of inputs on gate G16.

⅝ millisecond later after *p*12 has been read by the read station the output circuit (Fig. 4) operates and the telegraph relay is set to "space." Gate G101 is opened by the application of *p*12, it already having been prepared by previous application of its other three required inputs. When G101 opens, trigger circuit F12*a* operates and causes an output to appear on the "space" conductor.

The pulse train continues to circulate, and after a further 32 cycles requiring (a further 20 millisecond period of time) the condition of the first permutable element after the space or start element is examined and recorded in position *p*12. Assuming this element to be a "mark" then *p*12 will be recorded in the pulse train as "0."

The remaining permutable elements and also the "stop"

element are examined in the same way at 20 millisecond intervals and the telegraph relay set in accordance with condition of each element. It will be seen that as in normal regenerators the characters are delayed by half an element time by the regenerator because of the examination of the elements received at their midpoints.

A first element space insertion (Fig. 13) is provided to make quite sure that the "start" element of the telegraph character sets the telegraph relay to "space," and a 130 millisecond detector (Fig. 11) ensures that the "stop" element of the character returns the telegraph relay to "mark."

5 milliseconds after the "stop" element has been recorded the start cancel circuit (Fig. 7) proceeds to return all the pulse time positions in the pulse train to "0's" in readiness for the next telegraph character.

This cancelling is performed at record station No. 2 which is situated 10 pulse time positions away from record station No. 1. This means a "1" in position *p*2 is cancelled at station No. 2 at time P12. Similarly a "1" in position *p*1 is cancelled at station No. 2 at time P11.

The regenerator is also designed to cater for a short start fault condition and for a long space supervisory condition.

The short start fault condition occurs when a spurious pulse of less than 10 milliseconds duration appears on a telegraph line and has sufficient amplitude to operate the start circuit. A short start rejection circuit (Fig. 9) examines the start element at the end of the first cycle and if it is still there it assumes it is a normal start condition, but if it is not there it cancels the "1" in positions *p*2 and *p*7 thereby returning the pulse train to its normal condition. A long space supervisory condition is a situation where a space condition of longer duration than one character is transmitted over the circuit to enable supervisory signals to be sent.

In the long space condition the "stop" element is a "space" instead of a "mark." This condition, together with a "1" in position *p*11 which indicates that none of the previous elements in the character was a "space," operates the long space register (Fig. 10). This circuit cancels *p*2, records a "1" in position *p*1 as it passes record station No. 2, and records a "1" in position *p*12 so the telegraph relay is maintained at its "space" position. The long space cancel circuit (Fig. 12) in conjunction with the adding circuit (Fig. 5) and the long space register returns the telegraph relay to the "mark" or stop position 10 milliseconds after the long space condition has ended.

For the purposes of the following description the circuits of some well known electronic circuit tools have been indicated by illustrative symbols instead of complete detailed circuits. Many examples of these tools will be known to electronic engineers, each of whom will have his own preferance among the various well known types. Thus a trigger circuit is shown as a double rectangle with two control leads and two outputs, such, for instance, as is shown as F2 in Fig. 2, while a counting train consists of a number of side-by-side rectangular representing stages, with an end input, and an output at each stage shown, for instance, as C1 in Fig. 1. Most of the trigger circuits shown are controlled by rectifier gates of well known type of which examples are shown in Proceedings of the Institute of Radio Engineers, May 1950, in an article on "Diode coincidence and mixing circuits in digital computers" by Tung Chang Chen. Each gate is illustrated by a circle with one or more inputs and one output and an interior figure indicating the number of inputs on which coincidence is required for the gate to open shown, for instance, as gate G1, in Fig. 2. The interior figure of a gate may be equal to or less than the number of inputs. An inhibiting input in a gate i. e. an input which, when a suitable potential is applied, will prevent the gate opening irrespective of the potentials on the other inputs, is illustrated by a small circle on the circumference of the circle representing the gate. Such an inhibiting input may be seen in gate G3 in Fig. 2. These gates may be controlled by pulses derived from the clock pulse generator, or by the output from an amplifier or inverter, or by the trigger circuits: the exact ways in which these circuits apply their potentials to the gate are not illustrated as these are common place in the art and each engineer has his own preference. Thus considering gate G300 in Fig. 3 this has 4 inputs one of which is an inhibiting input, the 1 in the circle indicates that the gate will open when a suitable potential is applied to any of the inputs except the inhibiting input. A controlling potential on the inhibiting input will prevent the gate opening no matter what potentials are applied to the other three inputs.

Trigger F3 (Fig. 5) in the adding circuit is a three stage trigger in which only one section can be conducting at one time. Thus, when F3*a* is operated or conducting F3*b* and F3*c* are not operated or non-conducting.

CLOCK PULSE GENERATOR

The clock pulse generator is illustrated in Fig. 1.

The output from a 1 megacycle oscillator S is passed through a pulse-shaping circuit Z1 and an amplifier A1 to a 12 position counter train C1. This counter steps one position for each cycle of the oscillator to give outputs P1 to P12.

Each output from 12 of C1, when amplified by A2, steps counting train C2 one position to give pulses PL2.1 to PL2.5. Upon the coincidence of an output from 12 of C1 and 5 of C2 gate G1000 opens to step counter C3 and give outputs PL3.1 to PL3.10. By combining the outputs from C2 and C3, 50 sequentially occurring pulses are obtained. These pulses are used for scanning the telegraph lines and for selecting the corresponding output telegraph relay.

The output from Z1 is also fed to three delay networks D1, D2 and D3 to give pulses P*a*, P*b* and P*c*. (See Fig. 14.)

DETAILED DESCRIPTION OF REGENERATOR OPERATION

The detailed description of the regenerator operation will be given in three parts:

(*a*) Normal regeneration
(*b*) Short start condition on line
(*c*) Long space condition on line.

For convenience of the following description these conditions are assumed to occur on telegraph line No. 13, but the operation of the circuit will be the same for the other 48 lines. The outputs from C2 and C3 in the pulse generator which correspond to line No. 13 are PL2.3 and PL3.2.

(a) *Normal regeneration*

Referring to the start circuit which is illustrated in Fig. 2, each telegraph line is terminated in a gate similar to G1. The pulses PL from the pulse generator by virtue of their selective connection to gate G1 switch each line in turn to the mixing gate G2 which feeds the condition of each line to the input of amplifier A20. In the normal condition, that is when there is no telegraph character present, the line is in its "mark" or $-ve$ condition. G1 will not open in this condition so that there will be zero output from A20. There will, however, be a $+ve$ output from the inverter X30.

The start of a telegraph character is indicated by a "space" or $+ve$ condition on the line. G1 opens at time PL3.2 and PL2.3 to give a $+ve$ output at the amplifier A20 and a zero output from the inverter X30. At time P*a* of P2 (see Figs. 1 and 14), G3 opens since there is no inhibiting condition present on G3 from the long space circuit, and, through G4 operates F2*a*. G5 is open at time P2 and a positive Write pulse P is passed to G300 in the record circuit (Fig. 3) via G7. Similarly a positive Write pulse P is passed to G300 at time P7 via gates G6 and G7. After gate G300 opens and at time P*b* of P2, G400 (Fig. 3) opens and a "1" is recorded in time position *p2* of the pulse train allocated to telegraph line No. 13. A "1" is also recorded in time position *p7* (it will be remembered that in the normal condition of the line all the pulse time positions in the pulse train were "0's"). It will be seen that a "1" in time position P2 indicates a normal regeneration cycle while a "1" in *p7* gives a 10 millisecond displacement in the time scale.

After amplification by A10 the pulse train from G400 is put into the sonic delay line DL at record station No. 1 and ⅝ millisecond later is read from the line at the read station. After being amplified by A30 and shaped by X10 the train is applied to G100 which opens upon the coincidence of a "1" in the pulse train and P*a*. Thus at time P*a* of P2 G100 opens and sets trigger F1 to F1*a* to give a positive output. At subsequent time P*c* F1*b* operates to reset F1. The output from F1*a* is applied to an inverter X20 which gives a complementary output to F1*a*, i. e. is positive output when F1*a* is reset.

The adding circuit (Fig. 5) now operates. At time P*a* of P2 with F1*a* (Fig. 3) operated, G8 opens to operate F3*a* via G9. A positive potential is applied to the "invert" lead via G13 which, in the record circuit (Fig. 3), prepares G500 and inhibits G200. In the start circuit (Fig. 2) G600 operates at P*a*, P2, F1*a* and, via G4, operates F2*a* again (trigger F2 was previously reset at time P12 via G700). At time P2 a positive pulse is passed to the "Write P" lead via G5 and G7, and in the record circuit (Fig. 3) operates G300 to re-record a "1" in position *p2* at time P*b*. At time P*c*, trigger of P3 F1 is reset and a positive output appears at X20. In the record circuit G500 opens and is now controlled by the pulse appearing in the "invert" lead. In the start circuit (Fig. 2) G10 opens at time P3 with F3*a* of Fig. 5 operated and resets trigger F2 to prevent a "1" being re-recorded in time position *p7* through this circuit—later it will be seen that a "1" is recorded in position *p7* via G200 in the record circuit.

The law for adding "one" to a binary number is to invert all the digits up to and including the first zero. This is achieved by detecting the presence of the first zero by G11 in the adding circuit (Fig. 5), by operating F3*b* long enough for it to invert and record the zero, and by operating F3*c* through G12 at time P*c* of the next succeeding time position. Thus, at the end of the first cycle of the pulse train the time scale positions *p3* to *p6* are all "0's" so it is necessary only to convert position *p3* to a "1" and re-record the remaining positions as "0's." At time P*a* of P3, G11 operates to operate F3*b* and maintain the positive potential on the "invert" lead. G500 (Fig. 3) thus remains open and a "1" is recorded in position *p3*. At the succeeding pulse P*c*, G12 (Fig. 5) opens in the adding circuit to operate F3*c* and remove the potential on the "invert" lead. G500 (Fig. 3) shuts with the result that the remaining time position *p4* to *p6* are recorded as "0's." The absence of a positive potential on the "invert" lead also removes the inhibiting condition from G200 so that when F1*a* (Fig. 3) is operated by the "1" in position *p7*, G200 opens and re-records the "1" in position *p7*.

The pulse train continues to circulate in this way with "one" being added to the time scale at each cycle.

At the end of the 16th cycle i. e. 10 milliseconds after the first operation of the start circuit, there are "1's" in all the time positions *p3* to *p7* and the interval detector (Fig. 6) operates. This is indicated by the fact that after P3 to P7 (from the clock) F4*b* is not operated since only P3 to P7 are applied to the gate G15.

The interval detector of Fig. 6 determines the instant at which each telegraph element is examined and is arranged to "look" at each element in its centre. The start circuit commences to operate at the beginning of the "start" element which means that in order to examine the centre of the "start" element the interval detector must operate 10 milliseconds after the start circuit first operates and at 20 millisecond intervals thereafter for the remainder of the elements. Since it takes ⅝ millisecond of a pulse train to travel down the sonic line it is necessary to count 32 circulations in order to obtain a delay of 20 milliseconds. This is $2^5$ cycles of delay which can be represented as 5 binary digits. The time positions *p*3 to *p*7 are allocated for this number, a complete 20 millisecond period being denoted by "1's" in all these positions. It will be remembered that a "1" was recorded in position *p*7 when the start circuit was first operated. This means that "1's" appear in positions *p*3 to *p*7 after $2^4$ cycles which is a 10 millisecond period required for examining the centre of the start element, and from which subsequent counting starts.

Trigger F4 in the interval detector is set at each cycle of the pulse train. F4*a* (Fig. 6) is operated by G14 at time P*a* of P2 with F1*a* (Fig. 3). F4 will, however, be reset if there is a "0" in one of the positions *p*3 to *p*7. The only condition in which *p*3 to *p*7 are all "1's" is 10 ms., 30 ms., 50 ms. . . . 130 ms. intervals after the start circuit is first operated. In the former condition a "0" in, say, position *p*4 will give a positive output at X20 so that G15 will open at P*a* of P4 to operate F4*b* and reset trigger F4. In the latter case F4*a* remains operated and prepares gates G16, G17 and G18. If the telegraph element is a "spaced," which is the case for a start element, amplifier A20 in the start circuit of Fig. 2 will have a +*ve* output, but if it is a "mark" inverter X30 will have a +*ve* output. Thus for a "space" element G16 will open at time P12 to record a "1" in position *p*12 in the pulse train, but if it is a "mark" G17 will open at time P12 to inhibit gate G300 in the record circuit and cause a "0" to be recorded in position *p*12. In response to a "mark" element G18 will also open at time P11 to record a "1" in position *p*11. The purpose of the "1" in position *p*11 will be described later in the section dealing with a long space condition.

In order to make quite sure that a "1" is recorded in position *p*12 for a "start" element, a first element space inserter (Fig. 13) is provided. In this circuit F8*a* of trigger F8 is operated by P7 but is normally reset by one of the gates G805 to G809 being opened to operate F8*b* through G810 at one of the times P8 to P10. G805 opens at P8 if F4*b* (Fig. 6) is operated by a "0" in position *p*3 to *p*7; G806 opens at *p*8 if there is a long space condition; G807, G808 and G809 operate at P10, P9 and P8 respectively if there is a 1 in position *p*10, *p*9 or *p*8. Thus the only condition in which F8*b* is not operated is when there are "1's" in all the positions *p*3 to *p*7 i. e. 10 milliseconds after the operation of the start circuit—the time when the interval detector examines the "start" element. Under this condition G811 opens at P12 with F8*a* and a "1" is recorded in position *p*12.

After recording a "1" in position *p*12 in accordance with the "space" condition of the "start" element the pulse train is once again put into the delay line at station No. 1 (Fig. 3). The pulse train now has "1's" in positions *p*2, *p*8 and *p*12, the remaining positions being "0's." The pulse in position *p*8 occurs when *p*3–*p*7 are all "1's" and "one" is added to this binary number. The pulse position *p*8–*p*10 then indicates, in binary form, the number of elements examined.

⅝ millisecond later the pulse train is read at the read station. F1*a* will now be operated in response to the "1" in position *p*12. In the output circuit (Fig. 4) G101 opens at time P12 with F1*a* to operate F12*a* of trigger F12 and moves the output telegraph relay to "space."

The pulse train continues to circulate and at the end of 20 milliseconds, "1's" will be recorded in position *p*3 to *p*7. The interval detector will once again operate. Assuming the first permutable element is a mark then G18 (Fig. 6) opens to record a "1" in position *p*11 and G17 opens to record a "0" in position *p*12. The pulse train is once again put into the sonic line via gates G300 and G400, and at the read station, F1*a* will now not operate at time P12. In the output circuit G104 (Fig. 4) opens at P12 with an output at inverter X20 (Fig. 3) to operate F12*b* and so set the telegraph relay to its "mark" position.

The telegraph relay continues to be set in this way in accordance with each element examined until the last or "stop" element is examined and the relay set to "mark."

To make quite sure that the telegraph relay operates to "mark" in accordance with the "stop" element, a 130 millisecond interval detector is provided (Fig. 11). F5*a* of trigger F5 is operated by G799 at time P*a* of P2 each time a "1" is read in position *p*2 as indicated by operation of F1*a*, Fig. 3. Normally F5*b* will be operated by one of the gates G800 to G803 acting through G804. There is one condition, however, when none of these gates open and that is 130 milliseconds after the operation of the start circuit i. e. the centre of the "stop" element. In this one condition positions *p*3 to *p*7, *p*9 and *p*10 are "1's" and *p*8 is a "0." If F5*b* fails to operate, G40 opens at time P12 and inhibits gate G300 over write N lead in the record circuit (Fig. 3) thus causing a "0" to be recorded in position *p*12.

After setting the telegraph relay to "mark" in accordance with the "stop" element it is necessary to restore the pulse train to "0's" thus preparing it for the next telegraph character. To do this a start cancel circuit is used (Fig. 7). The "stop" element of a character is examined 130 milliseconds after the operation of the start circuit. The interval after this final examination of the "stop" element is arbitrarily chosen as 5 milliseconds; thus the start cancel circuit has to operate 135 milliseconds after the operation of the start circuit.

In the start cancel circuit F11*b* of trigger F11 is operated by G19 at time P*c* of P3 with F4*a* operated (F4*a* (Fig. 6) is operated as previously described when positions *p*3 to *p*7 are all "1's"). F11*b* will remain operated until G21 operates F11*a* which will only fail to occur when the positions *p*6 to *p*10 are set at 10111 which corresponds to the 135 millisecond period in binary notation (i. e. 5−10+20+40+80 ms.). With F11*b* operated G20 opens at time P12 and, through G22, sends a cancelling condition to record station No. 2 (Fig. 3) to change the "1" in position p2 to a "0" (it will be remembered that station No. 2 is 10 pulse time positions down the line from station No. 1).

In the absence of a "1" in position *p*2, as indicated by potential on X20, G25 in the time scale clearing circuit (Fig. 8) opens and operates F6*a* to inhibit G300 in the record circuit of Fig. 3 (over lead "write N"). F6*a* remains operated until time P*c* of the next P1 pulse opens G26 and, through G27 operates F6*b*, thus all the time positions in the pulse train are recorded as "0's" and the pulse train is prepared for the next telegraph character.

(b) *Short start rejection*

Spurious impulses may occur on a telegraph line which have sufficient amplitude to falsely operate the start circuit and initiate the train of events that eventually results in a false operation of the telegraph relay. Such impulses are generally of short duration.

The short start rejection circuit is shown in Fig. 9. F7*a* is operated at time P*a* by a "1" in time position *p*2 through G29 each time the pulse train is received at the read station as indicated by operation of trigger F1*a* (Fig. 3). Except for the second cycle when there is a "1" in position p3 and "0's" in positions *p*4—*p*10, trigger F7 will be operated by one of the gates G31 to G38 through G30 to reset F7*b*. At the end of the second cycle, however, F7*a* will remain operated unless G380 is opened at time P9 to operate F7*b*, and G380 will only open if the "space" element is still present on the line, i. e. there is no output from X30 in the start circuit of Fig. 2. If the "space" element disappears then, with F7*a* operated, as above, G24 in the start cancel circuit (Fig. 7) opens at time P12 and via G22 sends a cancelling condition over lead "cancel" to change the "1" in position *p*2 to a "0" as it passes record station No. 2, Fig. 3, as already described. At the read station the absence of a "1" in position *p*2 will remove the "1's" from the pulse train as has also already been described.

(c) *Long space condition*

A long space condition extending over several characters is sometimes used as a supervisory signal. In the regenerator it is necessary to prevent the telegraph relay being operated to its "mark" position by the 130 millisecond detector and to operate the relay to its mark position 10 milliseconds after the long space condition has ended.

A long space is detected by the combination of a "space" condition in the "stop" element of the telegraph character and the absence of a "mark" in any of the preceding elements of the character; the latter is indicated by the absence of a "1" in position *p*12 (it will be remembered that a "1" is recorded in position *p*11 by G18 upon the receipt of the first "mark" element).

The long space register and start circuit is illustrated in Fig. 10. When there is coincidence between a "0" in position *p*11 (indicated by potential on X20, P11) and a "space" element on the line (indicated by potential on A20 from Fig. 2) 130 milliseconds after the first operation of the start circuit when F5*a* operates in the interval detector of Fig. 11 as already described, G39 opens to record a "1" in position *p*1 at record station No. 2 (Fig. 3) over lead "write P." G39 also operates F9*a* through G41. At time P12, G42 opens to record over lead "write P" and G400 at time P*b*, a "1" in position *p*12 at record station No. 1 (thereby maintaining the telegraph relay over to its "space" position).

In the start cancel circuit of Fig. 7, F9*a* at the same time P12 opens G23 to change the "1" in position *p*2 to a "0" as *p*2 passes record station No. 2 (Fig. 3). In the start circuit on Fig. 2 F9*a* inhibits G3 thus isolating the line from trigger F2 and preventing the start circuit operating again after *p*2 has been converted to a "0."

It will be noted that F9*b* is operated by G411 at time P*c* of P1 (which occurs in the next succeeding pulse train) thereby removing the inhibiting condition from G3 and allowing the condition of the next telegraph line to be applied to F2 in the start circuit of Fig. 2. The inhibiting condition is re-instated by G412 at time P*a* of the P1 with F1*a* operated.

Returning to the condition of the pulse train, there are now "1's" in positions *p*1, *p*8 to *p*12.

Since there is a "0" in position *p*2 at the read station indicated by potential on X20, G25 opens in the time scale clearing circuit (Fig. 8) and F6*a* operates over lead "write N" to inhibit G300 in the record station No. 1. F6*b* is not operated until gate G160 opens at time P*c* of P11 with F9*a* operated. Thus the "1's" in positions *p*8 to p10 are converted to "0's"

There are now "1's" in positions *p*1, *p*11 and *p*12 and the pulse train will continue to circulate in this form until the long space condition on the line ends.

The end of the long space condution is denoted by the line returning to the "mark" condition. In the start circuit (Fig. 2) the output from A20 returns to zero but a positive output appears in inverter X30. In the adding circuit (Fig. 5) G140 opens at time P*a* of P3 with F9*a* operated to operate F3*a* through G9, thereby starting the adding circuit. In the time scale clearing circuit (Fig. 8) F6*b* will be operated through G27 by G150 at time P*c* of P3 with F9*a* and X30, thereby removing the inhibiting condition from G300 in the record circuit in time for the adding circuit to add "one" to the binary code in positions *p*3 to *p*7.

After a period of 10 milliseconds a "1" is recorded in position *p*7 and in the long space start cancel circuit (Fig. 12), G812 opens to operate F10*a* due to coincidence of P7, F9*a*, F1*a*.

In the start circuit of Fig. 2, F10*a* inhibits gate G813 thus removing the output inverter X30 and disabling the adding circuit.

G42 in the start cancel circuit is opened at time P11 with F10*a* operated and, through G22, converts the "1" in position *p*1 to a "0" as already described.

The absence of an output from X30 means that in the time scale clearing circuit G150 fails to open at P3 so the inhibiting condition on G300 remains until time P11 when G160 opens to operate F6*b*. Thus the "1's" in the time scale *p*3 to *p*7 will be recorded as "0's."

There are now "1's" in positions *p*11 and *p*12 which have to be cancelled.

In the long space register, G412, Fig. 10, does not open since there is no "1" in position *p*1 (F1*a* not operated) so F9*a* fails to operate. This means that in the time scale clearing circuit G160 will not open to operate F6*b* at time P11. Thus the inhibiter condition will remain on G300 until G26 opens at time P*c* of P1 in the next succeeding pulse train thereby cancelling the "1" in positions *p*11 and *p*12.

In the output circuit (Fig. 4) a "0" in position *p*12 with potential from X20, Fig. 3, operates F12*b* and moves the telegraph relay to its "mark" position.

While the principles of the invention have been described above in connection with specific embodiments, and particular modifications thereof, it is to be clearly understood that this description is made only by way of example and not as a limitation on the scope of the invention.

What I claim is:

1. Timing equipment which comprises an electromechanical store providing a delay characteristic, means for continuously reading intelligence in said store, counting means for counting the number of complete readings made of said store, and means responsive to said counting means for effecting a further operation when a predetermined number of complete readings has been made.

2. Timing equipment as claimed in claim 1 in which the current reading of a count is stored in said store during each reading, and which comprises means for reading, adding one to said count, and re-storing the new reading at the end of successive complete readings.

3. Timing equipment as claimed in claim 1 and in which said store comprises a sonic delay line wherein intelligence may be stored in the form of sonic waves.

4. Timing equipment as claimed in claim 1 in which said store comprises a sonic delay line and in which the intelligence stored therein comprises a number of separate pulse trains which are stored pulse by pulse and in succession.

5. Timing equipment as claimed in claim 1 in which said store comprises a sonic delay line and comprising means for storing pulse trains therein, a reading station associated with said sonic line and adapted to read said pulse trains pulse by pulse and in succession, an adding circuit adapted to modify one or more selected pulse trains by adding one to a binary number recorded in each selected pulse train each time that selected pulse train is read whereby the number of transmissions down the sonic line performed by a selected pulse train is recorded in that pulse train, and a recording station for re-storing said modified and unmodified pulse trains pulse by pulse and in the same order in which they were read.

6. Electric signal regenerating system comprising a store, means for storing intelligence therein, means for continuously reading the intelligence in said store and means for determining the length of a regenerated signal by the time taken for a predetermined number of complete readings of said store.

7. Electric signal regenerating system as claimed in claim 6 and in which said store comprises a sonic delay line wherein intelligence may be stored in the form of sonic waves.

8. Electric signal regenerating system as claimed in claim 7 and in which said intelligence comprises a number of separate pulse trains which are stored in said sonic delay line pulse by pulse and in succession.

9. Electric signal regenerating system as claimed in claim 6, and wherein said electric signals are telegraph characters.

10. System for regenerating telegraph characters comprising a source of pulses, means for identifying a "start" element, means for recording a start pulse in a pulse train upon the identification of said start element, means for storing said pulse train in a sonic delay line store pulse by pulse means for reading said stored pulse train pulse by pulse a predetermined time later, means for amplifying and restoring said read pulse train whereby said pulse train is circulated round said store, means responsive to said start pulse for counting the number of circulations performed by said pulse train and for adding one to a binary number recorded in said pulse train upon the completion of each circulation, means for detecting predetermined binary numbers recorded in said pulse train and for examining the condition of an element each time one of said predetermined binary numbers is detected, said binary number being so chosen that each element is examined in turn, means for recording in a mark/space pulse position in said pulse train the condition of each element examined, an output relay, means for operating said output relay in accordance with said mark/space pulse position whereby said output relay is operated in accordance with the condition of each telegraph element, and means for clearing said pulse train in preparation for the next telegraph character a predetermined time after said output relay has been operated in accordance with a "stop" element.

11. A system for regenerating telegraph characters as claimed in claim 10 and comprising short start rejection means for examining said start element at a predetermined time after said recording of the start pulse and before the first of said predetermined numbers is recorded in said pulse train, said short start rejection means being adapted to clear said pulse train if said start element condition is no longer present at said predetermined time.

12. A system for regenerating telegraph characters as claimed in claim 10 and comprising means for detecting a long space condition and for maintaining said relay over at its space position upon the detection of said long space condition, means for stopping said counting means upon the detection of said long space condition and for clearing the binary number recorded in the pulse trains, means responsive to the termination of said longe space condition for restarting said counting means to count a pretermined number of circulations of said pulse train, means for operating said relay to its mark position at the end of said count.

13. A multiple telegraph regenerator comprising a sonic delay line circulatory store having a predetermined delay period, a first record station, a second record station, and a read station associated with said delay line, a start circuit, an input circuit adapted to scan each incoming telegraph line in turn and to pass the condition of each scanned line to said start circuit, said start circuit being arranged to detect a "start" element on any one of said incoming lines and to record a start pulse in a pulse train individually allocated to that line, means at said first record station for launching on said sonic line in succession and pulse by pulse a series of pulse trains, one for each incoming line, said pulse trains thereafter travelling down said line to the read station in a time equal to said delay period, means at said reading station for reading said pulse trains pulse by pulse and in succession, amplifier means for amplifying said read pulse trains and for returning them to said first record station whereby said pulse trains are continuously circulated, an adding circuit operated by a start pulse in a pulse train and adapted to count the number of circulations of that pulse train and to add one to a binary number recorded in that pulse train for each circulation completed, an interval detector adapted to be operated by predetermined binary numbers in each pulse train and to examine the condition of the line associated with a pulse train upon the occurrence of said binary numbers in that pulse train and to record in a mark/space pulse position in that pulse train an indication of the condition of the line, said predetermined binary numbers being so chosen that each element of a telegraph character on the line is examined in turn, an output circuit associated with each incoming telegraph line and adapted to operate an output telegraph relay, said output circuits being scanned in synchronism with said incoming lines, each output circuit being adapted to be operated in accordance with the condition of the mark/space pulse position in its associated pulse train whereby said output relay is operated in accordance with the condition of each telegraph element, a start cancel circuit operated by a predetermined binary number in each pulse train and adapted to cancel the start pulse in the appropriate pulse train as it passes said second record station, the cancelling of said start pulse taking place a predetermined time after the output relay has been operated in accordance with the "stop" element in the telegraph character, a time scale clearing circuit adapted to operate in response to a cancelled start pulse to clear the appropriate pulse train in preparation for the next telegraph character on the line.

References Cited in the file of this patent

UNITED STATES PATENTS

| | | |
|---|---|---|
| 1,867,209 | Chauveau | July 12, 1932 |
| 2,609,451 | Hansen | Sept. 2, 1952 |
| 2,688,740 | Merrill et al. | Sept. 7, 1954 |